Jan. 13, 1959
A. C. PETERSON
2,867,978
DUAL SYSTEM PROPULSION MEANS
Filed Feb. 4, 1957
3 Sheets-Sheet 3
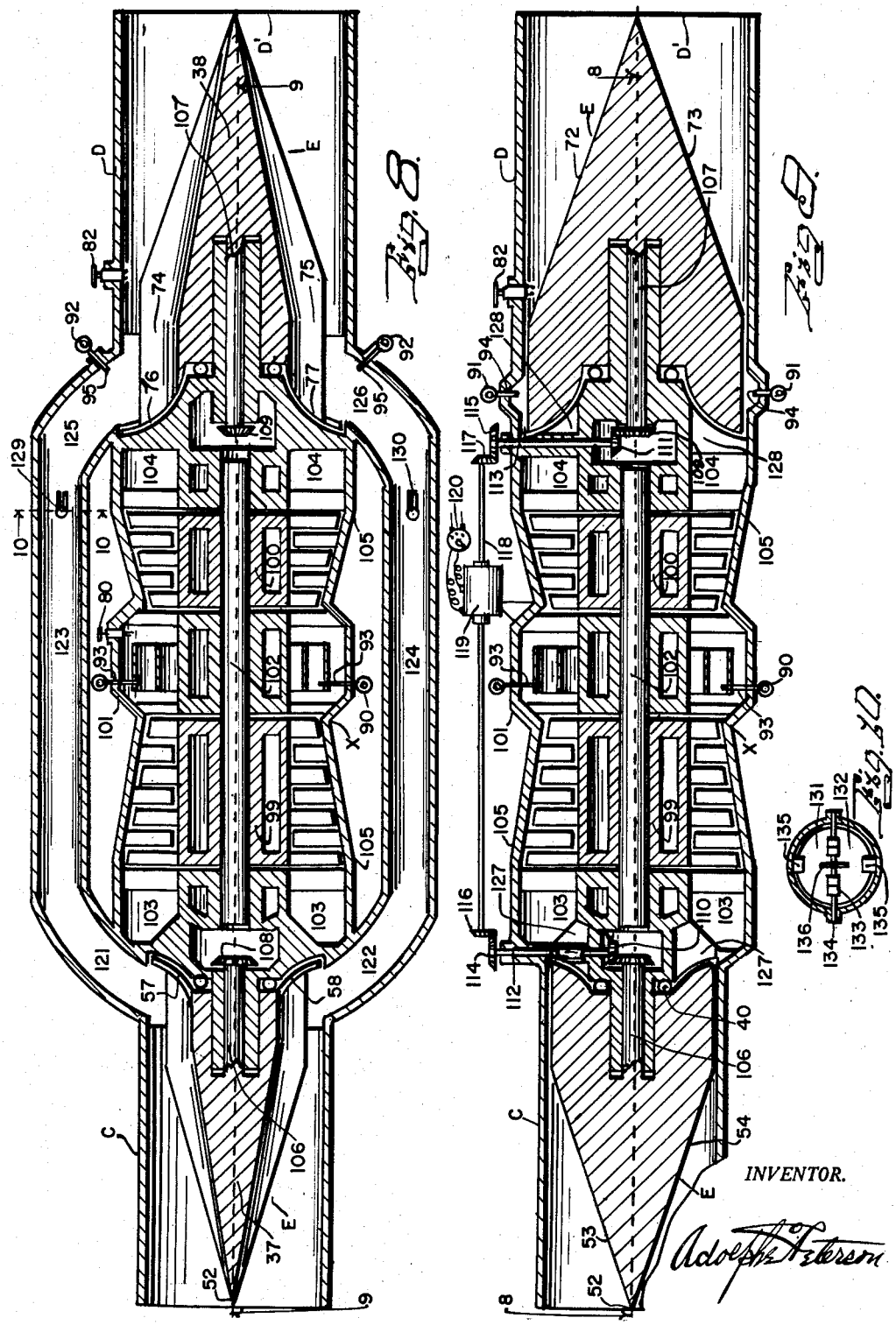
INVENTOR.
Adolph C. Peterson United States Patent Office 2,867,978
Patented Jan. 13, 1959

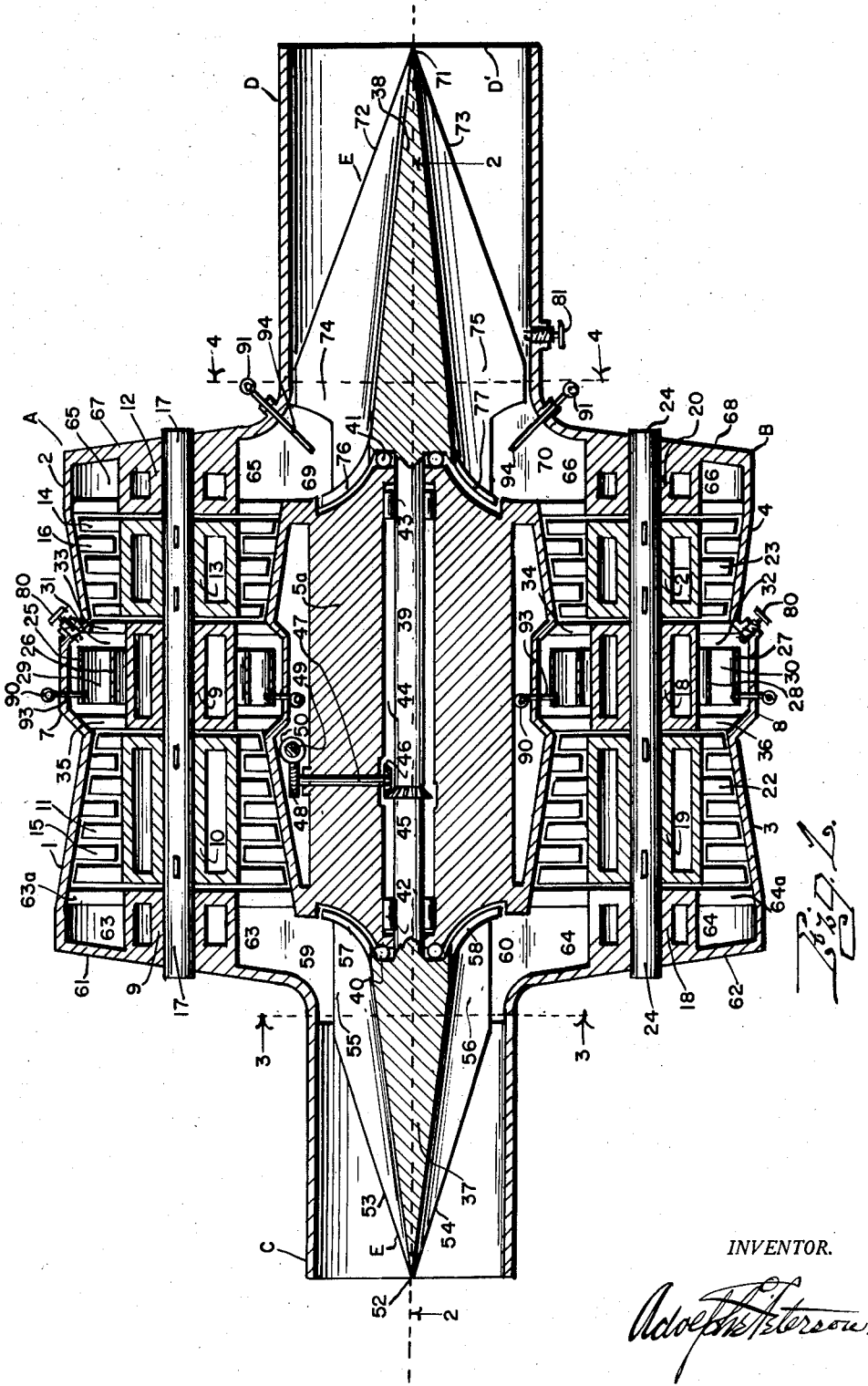

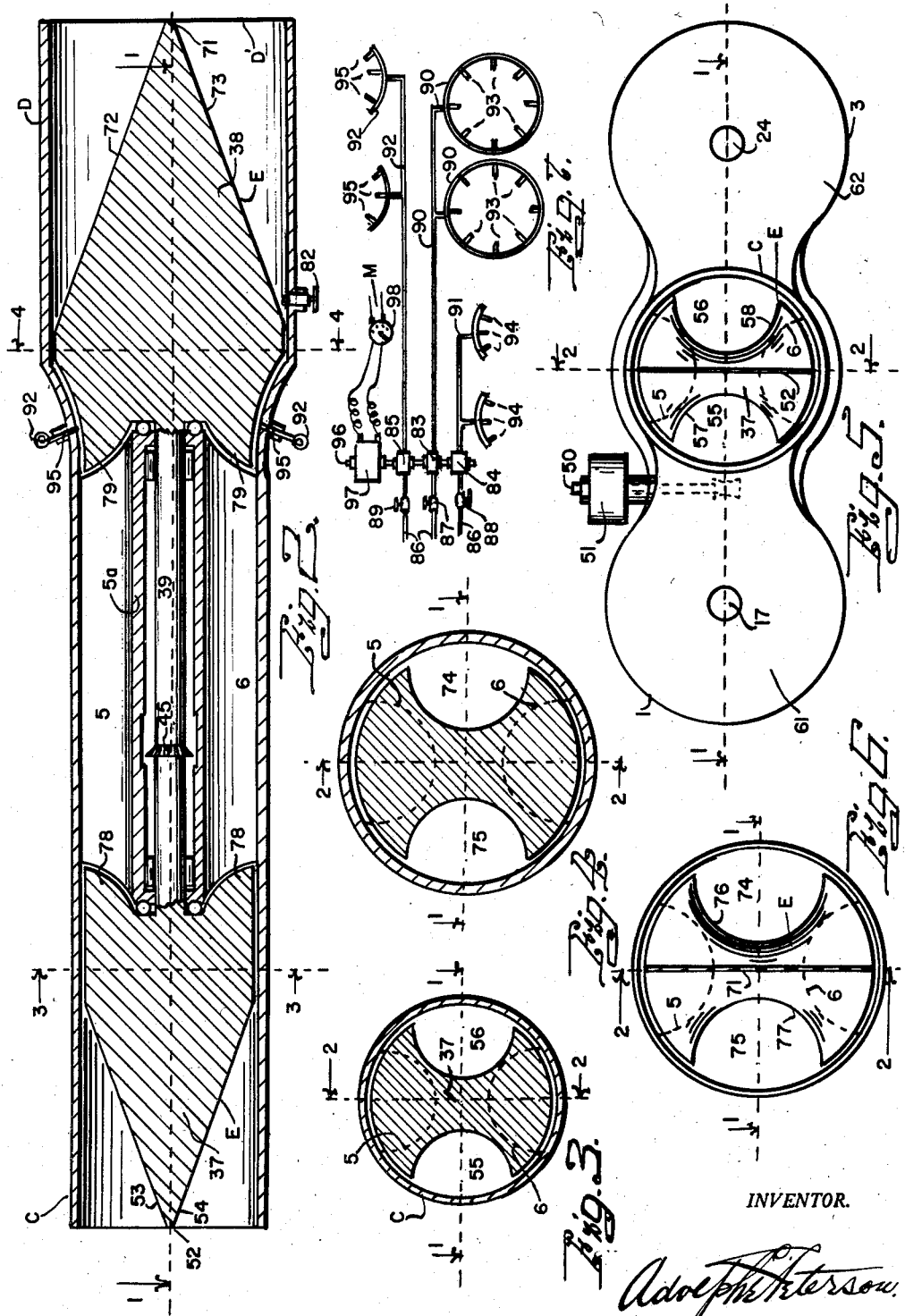

2,867,978
DUAL SYSTEM PROPULSION MEANS
Adolphe C. Peterson, Minneapolis, Minn.
Application February 4, 1957, Serial No. 638,170
10 Claims. (Cl. 60—35.6)

My invention relates to jet propulsion means and particularly to a system involving a duel system of flow wherefore it is called dual system propulsion means.

The principal objects of my invention are to provide a form of jet propulsion means, especially for aircraft, which shall employ one form of air and gas flow particularly adapted for travel at lower speeds and lower altitudes and another form of air and gas flow particularly adapted for travel when higher speeds and higher altitudes are attained, in order that greater speeds may be attained in the higher altitudes and when relatively high speed is once attained, and in order that greater efficiency in the use of fuel may be attained at the different ranges of speed. A principal object is the provision of a relatively simple form of changing the flow of air and gases in this means so that the different methods of flow and use of the gases may be achieved. A principal object is the provision of a means for the utilization of fuel and air in an aircraft or other jet propulsion engine in two different methods in the same device so that in one range of speed, especially at starting and just after starting, a more efficient means of use is provided, and so that in high stages of speed, the usual operating components for jet propulsion, may be stopped in their operation to save wear and tear thereon, the propulsion being continued in the higher speeds without substantially any wear on these operating parts by the use of the ram-jet method of propulsion. A principal object is the provision of a means for jet propulsion which after attaining speed may readily be changed in its operation, while in flight or travel, so that the other ram-jet method of propulsion may enable attainment of a higher range of speed, such as may be unattainable for the device or a device while operating under the normal turbine method of operation. An object is the provision of such a means which shall be especially adapted to stream lining in an air craft or vehicle, and shall thus be especially adapted to construction and use of very high speed commercial, passenger or military type of aircraft and vehicles.

The principal devices and combinations of devices comprising my invention, are as hereinafter described and as defined in the claims. In the accompanying drawings which illustrate my invention in several different forms, like characters refer to like parts throughout the several views, in so far as practicable. Referring to the drawings:

Figure 1 is a view chiefly in horizontal cross section on a plane passing through the axes of the chief operating elements of the device, some parts being shown in full plan view, this section being a section on the line 1—1 of Figures 2, 3, 4, 5, and 6.

Figure 2 is a section on a vertical plane passing through the longitudinal axis of the principal flow elements and the axis of the control valve of the device, this section being on the lines 2—2 of Figures 1, 3, 4, 5, and 6, some parts being shown in full side elevation.

Figure 3 is a transverse section on the line 3—3 of Figures 1 and 2, showing by dotted lines the relative position of the alternate flow channels, which are rearwardly of this section.

Figure 4 is a transverse section on the line 4—4 of Figures 1 and 2, showing by dotted lines the relative position of the alternate flow channels, which are forwardly of this section.

Figure 5 is a front elevation of the device, looking from the leftward end of the device as shown in Figures 1 and 2.

Figure 6 is a view looking from the rear of the device, that is from rightwardly of the device as shown in Figures 1 and 2, but showing nothing forwardly of the expulsion or discharge jet tube.

Figure 7 is a detail diagrammatic view illustrating diagrammatically only the fuel supplying means for the devices shown in Figures 1 to 6, inclusive, this view being on a very small scale and illustrating only the fuel supply and injection devices.

Figures 8 and 9 illustrate a modified form of my device, wherein there is utilized only one turbine and compressor instead of the two as in the first form illustrated. Of these figures, Figure 8 is a view in horizontal cross section through the chief operating elements, this section being on the line 8—8 of Figure 9, some parts being shown in full plan view.

Figure 9 is a view in vertical section on a plane passing through the axes of the chief operating elements of the device, this section being on the line 9—9 of Figure 8, some parts being shown in full side elevation, and some parts being broken away.

Fig. 10 is a detail enlarged view of one of the flap-valve means of Figure 8, partly a section on the line 10—10 of Figure 8.

Referring first to the Figures 1 to 7 inclusive, there is here shown a preferred form of my device, which generally employs two (or more) compressor turbine sets and an intermediately located air induction tube and in the same axis an intermediately located gas expulsion jet tube. One compressor turbine set is denoted A and the other is denoted B. The air induction tube is generally denoted C and the gas discharge tube is generally denoted D.

The air induction tube C and the gas expulsion tube D generally with other devices, constitute the ram-jet means; and this same air induction tube C and the gas expulsion tube D together with the compressor turbine sets A and B, with other devices generally constitute the turbine or powered jet means of the device.

The tubes C and D are in axial alignment, the tube D being somewhat larger in cross sectional area internally than the cross sectional area of the tube C. On diametrically opposite sides of the longitudinal area occupied by the tubes C and D the compressor turbine sets A and B are mounted by their casings 1—2 and 3—4, respectively, and in the area intermediately of the casings 1—2 and 3—4, there is located a so-called channel section 5ᵃ which has formed therein a pair of channels 5 and 6, these being located on diametrically opposite sides of the longitudinal axis of the intermediate section 5. The intermediate channel section 5 is located longitudinally intermediately of the tubes C and D and its axis is the same as the axis of the tubes C and D extended rearwardly and forwardly, respectively.

The casing 1—2 forms in part 1 the compressor casing and in part 2 the turbine casing of compressor turbine set A, and there is intermediately of casings 1 and 2, formed integrally therewith or joined thereto, the coaxial annular combustion casing 7, this latter internally being in flow sequence between the casing 1 and the casing 2. The casing 3—4 forms in part 3 the compressor casing and in part 4 the turbine casing of compressor turbine set B, and there is intermediately of casings 3 and 4, formed integrally therewith or joined thereto, the co-axial annular combustion casing 8, this latter internally being in flow sequence between the casing 3 and the casing 4.

The casing 1 has been mounted in bearings 9 for rotation therein, the compressor rotor 10 with its compressor blades or vanes 11. The casing 2 has been mounted in bearings 12 therein for rotation therein, the turbine rotor 13 bearing blades 14. The casing 1 has compressor stator blades 15 and the turbine casing 2 has turbine stator blades 16 mounted therein. The shaft 17 is common to compressor rotor 10 and turbine rotor 13 or may be disjointed and connected for rotation. The casing 3 has been mounted in bearings 18 for rotation therein the compressor rotor 19 and the casing 4 has been mounted in bearings 20 for rotation therein the turbine rotor 21, the former bearing blades 22 and the latter blades 23. The shaft 24 is common to rotors 19 and 21 or may be disjointed and connected for rotation together.

The casings 7 and 8, respectively, have formed within them, a pair of annular shells 25—26 and a pair of annular shells 27—28. These means provide in each combustion casing 7 or 8 provisions for separation of the air flow into a primary combustion stream in annular spaces 29 and 30, respectively, and cooling air streams on each side of the shells forming the combustion streams, the cooling air streams mixing however with the combustion streams in annular spaces 31 and 32, respectively. The joined combustion streams are passed by nozzles or blade guides 33 in the one set and 34 in the other set into the associated turbine casing 2 or 4, respectively. Blade guides 35 and 36 respectively guide the air flow in sets A and B.

The tubes C and D and intermediate channel section 5ª are in axial alignment in the sequence, from front to rear, namely, tube C, channel section 5 and tube D, so that, according to the control of the control valve, generally denoted E, when said valve E is placed for such passage, there will be open passage from the interior space of the tube C, through the channels 5 and 6 of the intermediate section 5ª, to the interior space of the tube D and therefrom rearwardly of the device to the atmosphere rearwardly of the device. The air passing from tube C will be divided in the two channels 5 and 6 in this passage and will again unite in the interior space of tube D.

The control valve E has two valve sections, the air valve 37 and the discharge control valve 38, and these two sections are rigidly united for movement in unison, when moved, by the valve shaft 39, which valve shaft extends in the axial center of intermediate section 5ª, from the air valve 37 to the discharge control valve 38. Immediately rearwardly of air valve 37 there is a ball bearing 40 which is placed between the rear face of air valve 37 (that is, its hub portion) and the front end face of the intermediate section 5ª, so that axial thrust of the air valve 37 rearwardly is absorbed by this ball bearing 40 as it is thrust against the said front face of intermediate section 5ª. Immediately forwardly of the discharge control valve 38 there is a ball bearing 41 which is placed between the forward face of the discharge control valve 38 and the rear end face of the intermediate section 5ª, so that axial thrust of the discharge control valve 38 in the forward direction, against the intermediate section, is thereby absorbed.

The valve shaft 39 is mounted in roller bearings 42, 43, to hold it rigidly in the axial position in the intermediate section 5ª, while still permitting free rotation of the valve shaft 39 with its integrally formed or attached valves 37 and 38. Intermediately of the valve shaft 39, in the internal bore 44 of the intermediate section 5ª, there is fixed on valve shaft 39, a bevel gear 45, with which there is in engagement a smaller bevel gear 46. The latter is fixed on the end of a horizontally disposed shaft 47 extending transversely in intermediate section 5ª to a location outwardly thereof, and at the outward end there is fixed on shaft 47 a worm wheel 48 with which there is in engagement a small worm wheel 49, the latter being fixed on the lower end of a vertically disposed shaft 50, said shaft 50 being the vertical shaft of the armature of a small control motor 51, the latter being an electric motor of a reversible type preferably, controlled by control means which may be in the pilot's control cabin, such control means being of any type. There may be any indicating means associated with the shaft 50 or shaft 39 to indicate the position of the valve means 37—38, such indicating means being commonly known and used, so it is therefore not particularly shown. In lieu of the electric valve operating means shown, there may be utilized instead any form of valve controlling or locating means which will give to valve shaft 39 and valves 37—38, the rotational movement for its control.

The air valve 37, which is located in the interior space of the tube C, is an air directing means as well as air control means, and it is formed generally to have a forwardly extended so-called knife edge 52 (Fig. 5) in the extreme forward end of tube C, and extending rearwardly therefrom on two opposite sides, the two laterally inclined sides 53, 54, which recede from the knife edge 52 and are in stream-lined form shaped into the two semi-circular shaped channels 55 and 56, respectively, in the rearward portion of the air valve 37, these channels 55—56, being each open at their extreme rearward end, and shaped in the transverse cross section exactly similarly to the transverse cross sectional shape of the channels 5 and 6 of the intermediate section 5ª, so that when the control valve E is turned into the position for such conjunction, the rearward open semi-circular ports 57—58 of the air valve 37 will exactly conjoin the channels 5—6, respectively, and form complete channels of the same form extending from the two sides of the valve 37 to the space about the discharge control valve 38. The front end of the intermediate section 5ª, immediately behind the air valve 37, is shaped, as shown, Fig. 1, in those portions immediately behind the ports 57—58, in conical curving form so that when this forward end of section 5ª is immediately in line with ports 57—58 of air valve 37, this forward end of intermediate section 5ª will form curving surfaces rearwardly of the channels 55 and 56, to direct air flowing rearwardly in channels 55—56, in a curving stream laterally from the longitudinal axis of air-valve 37 and thereby into and through the laterally extended port-channels 59—60, which are respectively on diametrically opposite sides of the rearward end of the tube C and are formed in the material of the rear end of tube C and the adjoining front metal faces 61 and 62, respectively, of compressor-turbine units A and B. These port-channels 59—60 are each formed to direct air from its respective side of the tube C, the control valve E being properly stationed, into the annular induction chambers 63 and 64, respectively, of the compressor-turbine sets A and B, where the air is directed by the air guides 63ª—64ª, into the compressing spaces of the compressors.

The compressor-turbine sets A and B, have respectively, gas discharge chambers 65 and 66, at their rear ends, enclosed at the rear sides by the rear faces 67—68, respectively, of sets A and B, and these gas discharge chambers, of annular form, discharge by way of streamlined port-channels 69—70, respectively, so-called discharge ports, into the interior space of the tube D, rearwardly of the intermediate section 5ª, the control valve E being in the position permitting this discharge. The discharge control valve, which extends generally from the rear of the intermediate section 5ª to the location at or near the rearward end of the tube D, is shaped somewhat similarly to the shape of the air valve 37, but is oppositely directed in its general shape, and has at its extreme rearward end the knife edge 71, Figs. 1 and 6, and at its sides has the two inclined surfaces 72—73, respectively, which at the forward ends thereof form the two semi-circular shaped channels 74—75, and the latter being each open at their extreme forward ends by means of the ports 76, 77, respectively, so that, when these ports are placed for conjunction, the ports will be exactly in line with the rear ends of the channels 5 and 6, respectively and of the same semi-circular shape, so that, the valve E being properly placed, there will be discharge from the rear ends of channels 5 and 6, into these channels 74—75 by way of ports 76, 77. At any time, when the valve E is placed for conjunction of the channels of valves 37 and 38 with the channels 5 and 6, there will coincidentally be conjunction at the forward and rear ends of channels 5 and 6, so that the flow from air tube C through channels 5 and 6, to discharge tube D will be uninterrupted. When the valve E is placed for the opposite control, the rear faces 78 of air valve 37 and the front faces 79 of discharge control valve 38 will obstruct the front and rear ends, respectively of channels 5 and 6, and coincidentally the channels of air-valve 37 will be opened to the port channels discharging air to the annular induction chambers 63—64 of sets A and B, and coincidentally the port-channels 69—70 discharging from annular discharge chambers of sets A and B, will be opened to the channels of the discharge control valve 38 and thereby to the interior space of tube D and the port D¹ at the latter's rear end to atmosphere.

There are spark plugs 80, 81, and 82, to perform the function of ignition in any of the control conditions, and these spark plugs are supplied with current in any manner, such means being well known. A fuel supply means, which is diagrammatically shown, in Figure 7 (which shows only the fuel supply, conduits, and nozzles, in reduced scale), has three fuel pumps 83, 84, 85, each of which receive fuel from supply pipes 86, as controlled by hand valves 87, 88, 89, and delivers fuel into its associated conduit 90, 91, or 92. The latter conduits deliver, respectively, into associated nozzles 93, 94 or 95. The nozzles 93 deliver some of the fuel into the annular combustion space 31 of compressor turbine set A, and some of the fuel into the annular combustion space 32 of compressor-turbine set B, where the fuel, when flowing mixes with air. The nozzles 94 deliver some of the fuel into the port channel 69 on one side of the tube D and other nozzles 94 deliver fuel into the other port channel 70 on the other side of tube D, where, when fuel is flowing therethrough, the fuel mixes with the air and combustion gases flowing therein from sets A and B to support combustion in tube D for increased power when that is desired. The nozzles 95 deliver some of the fuel into the air flowing from channel 5, when valve means E is placed for such flow, and some of them deliver into the air flowing from channel 6, when the valve means E is in condition for such flow. Nozzles 95 are shown in Figure 2 and they are placed generally so that the fuel mixes thoroughly with the air flowing from channels 5 and 6, when valve means E is placed for that flow. Nozzles 93 and 94 are shown in Figure 1.

The fuel pumps 83, 84, 85 are all driven by one common drive shaft 96 and the latter is driven by a variable speed electric motor 97 which receives electric current from supply lines M according to the control of a variable control means 98. The pilot may thus control the fuel supply generally by means of the variable electric control 98 to drive the pumps at a variable speed. He may control the delivery of fuel by each of pumps 83, 84, 85, independently, by means of the hand valves 87, 88, 89. It is to be noted that the means for control of the fuel supply is only diagrammatically shown, and may be of any type such as may commonly be used in fuel supply means or injection means to control the flow of the fuel. Such means may for instance be any type of fuel by-passing means, as commonly known, the control shown being intended to include broadly any type of fuel control, to accomplish the objective, namely, variable supply of quantity of fuel to any of the three groups of nozzles, as above designated, and discontinuance of fuel supply to any of the groups of nozzles, or commencement of the fuel supply to any of the groups of nozzles designated.

Having generally described the construction, the operation of the device is in general outlined, as follows. It is contemplated that this means may have any of the forms of starting means as generally used with turbines, whether of the power or jet type, or the turbines may be started by any means for delivering a large volume of air into the front or forward end of the air induction tube C, such means being available for such use. In starting of the device, the valve means E will be placed in the position, as shown in Figures 1 and 2, where the air valve 37 closes the front end of the channels 5 and 6, and opens the port channels 59—60 to the interior space of tube C and permits air to flow into the annular induction chambers 63—64 of the sets A and B. In this position of the valve means, the discharge from the sets A and B will be permitted to flow into the interior space of tube D, and there will be now flow from channels 5—6 to tube D. In this condition of the air flow, the pilot will now open the hand valve 87 which permits fuel, preferably some type of petroleum fuel, to flow to nozzles 93 and thereby to the annular combustion chambers 29—30 of sets A and B, and thereupon this fuel will be ignited by the spark plugs 80. The ensuing combustion will be continuous and cause driving of the turbines of sets A and B in the well known manner, and compression of air and induction of air to supply this combustion will continue in each set A and B. The pilot may increase the fuel supply, and thereby sufficiently increase the power flow so that the air plane or craft with which the device is associated will be enabled to take off or travel. The pilot may increase that flow by opening the hand valve 88, whereupon there will be additional flow of fuel to the gas and surplus air stream issuing then from sets A and B to the interior space of tube D, and there will thus be increased combustion in tube D adding to the propulsion effect of the jet in tube D. The air-craft, with which the device is associated and on which it may be mounted, may by this power means, utilizing the flow of gases from compressor-turbine sets A and B, climb to high altitude, and even into the upper strata of the atmosphere, the associated air-craft being designed therefor, and the speed of the air-craft may approach, say five or six hundred miles per hour. At the suitable speed, according to the design of the air-craft, the pilot may, if he then desires, close the hand valves 87, 88 and thereby discontinue flow of fuel to nozzles 93 and 94, and he may then immediately or even contemporaneously, by means of the control of the electric motor 51, cause the valve shaft 39 and its attached valves 37 and 38, to turn into the alternate position, in which condition, the air flow from tube C into sets A and B, and the discharge therefrom into tube D, will discontinue. It is assumed that the air-craft is now traveling at the high speed of say five or six hundred miles per hour, or the predetermined or critical speed at which the change should be made, and, the valve means E being in the alternate position, as stated, air will now flow from the atmosphere into the interior space of tube C and will be divided by the valve 37 into two streams flowing through channels 55—56 of valve 37, through ports 57—58 of valve 37, and thereby into the front ends of channels 5 and 6 of intermediate section 5ᵃ, and will flow through said channels 5—6, and through ports 76—77 of valve 38 into the channels 74—75 of valve 38 and, the pilot having now opened hand valve 89, fuel flowing to nozzles 95 will now mix with the air entering the tube D at channels 74—75 of valve 38, and there will be combustion of this fuel with the air and combustion will continue and propulsive pressure of the combusting and discharging gases in tube D to exert forwardly propelling propulsion against the valve 38 and thereby against the unit described, and through it to the air-craft on which it may be mounted. This propulsion effect is in the manner of jet devices and specifically the jet devices of the ram-jet type, the principle of which is well known.

The fuel pump 85 should be proportioned to provide that quantity of fuel which will provide the most efficient ratio of fuel to air flow for combustion to produce the most efficient propulsive effect, and likewise the relative size of the tube D to the size or internal diameter of the tube C should be determined with this end in view, and the relative inclinations of the sides of the valve 38, especially, should be determined, and the length of the valve 38, proportioned to provide the greatest propulsive effect in the expulsion of the gases of combustion in tube D. It is not contemplated that the ram-jet type of propulsion, as described in connection with the alternate position of valve means E (valves 37 and 38), will be adopted in flight of an air-craft, or any other craft with which the means may be associated, and on which it may be mounted, until the craft, whatever its form, has attained a speed, sufficiently high, so that the air flow through the tube C into channels 5—6 and to tube D, will be sufficiently great, as caused by the speed of the craft, to provide the pressure and speed of the air in that flow, in sufficient quantity to support and properly maintain combustion for ram-jet propulsion in tube D.

Referring now to Figures 8 and 9, which show a modified form of my device, this form operates in general in method similar to the form first described, but this form differs from that form, in that only one compressor turbine set, denoted X is provided, with its associated turbine and power shaft. The elements of this set X are denoted briefly compressor rotor 99, turbine rotor 100, combustion chamber 101, shaft 102, annular induction chamber 103, annular discharge chamber 104, casing 105. The fuel supply means and nozzles are designated as in the first form, as are the spark plugs also.

This form has at the forward end, a valve shaft 106 on which is fixed the air valve 37, and at the rear end has the valve shaft 107 on which is mounted the discharge control valve 38. These valves 37 and 38 are formed substantially similar to the forms of the valves 37 and 38 of the first form, and face or are directed similarly, forwardly and rearwardly, respectively, so that valve 37 controls the air intake, and valve 38 controls the discharge at the rearward end of the device. The valve shafts 106 and 107, respectively have fixed thereon, bevel gears 108 and 109, and the latter are respectively in gear with bevel gears 110 and 111 on the shafts 112, 113. The latter shafts have bevel gears 114, 115, fixed thereon, and these gears are in engagement with bevel gears 116, 117 on opposite ends of a valve control shaft 118 common to the valve means. This common shaft 118 is driven by the electric motor 119 according to the control of a control means 120, whereby the pilot may simultaneously and in like degree and direction turn the two valves 37 and 38. Thereby the valves 37 and 38 are simultaneously located in either the one position for flow of air into and out of the compressor turbine set X, or are in the alternate position located for discontinuance of flow through compressor-turbine set X and to permit flow from tube C directly rearwardly and transversely into the two port channels 121, 122, respectively, and thereby into and through the conduits 123, 124, respectively, and through port channels 125, 126, respectively, at the sides of tube D and thereby into tube D. The conduits 123 and 124 are located one at each side of the compressor-turbine set X, in the horizontal plane, and extend directly rearwardly to direct the flow in as directly rearwardly a manner, as possible, into the tube D. The tubes C and D, are in this form, located one forwardly and the other rearwardly of compressor turbine set X, and the axes of tubes C and D are coincidental with the axis of set X extended, forwardly and rearwardly, respectively. In the alternate condition, for turbine power production, the air will flow from tube C through ports 57—58 of valve 37, by means of port-channels 127 in the front end of casing 105, into annular chamber 103, and in the gas discharge from the turbine of set X will flow through port channels 128, and thereby through ports 76—77 of valve 38 into the interior space of tube D. The fuel nozzles of the three groups of fuel supply function similarly to the supply of the first form except that there is supply of fuel only to the one compressor turbine set X in this form. The nozzles 94 and 95 operate and are controlled as in the first form described, to provide fuel for combustion in tube D, in either condition. The nozzles 95 in this form provide the fuel for combustion when air flows through conduits 123 and 124 to tube D, for ram-jet propulsive effect.

The conduits 123 and 124, are each shown to have disposed in them, flap valves, generally denoted 129 and 130, respectively. These flap valves are of any form such as may commonly be used in plusing ram-jet means. One of these is shown in enlarged view in Figure 10, looking from the left of Figure 8, Fig. 10, being in part a section on line 10—10 of Figure 8. In Figure 10, a flap-valve is shown as composed of two semi-circular shaped valves 131 and 132, each of these is hinged by the hinge means 133 on a short valve shaft 134, and is limited in its movement in the direction closing the conduits 123 or 124, by stops 135, and is yieldably moved in this direction by the light leaf spring means 136 which at its ends is attached to the two parts of the flap valve. The two parts of the flap-valve, 131, 132, open the conduit by swinging toward each other under the impulse of air-pressure within the forward part of the conduit 123 or 124, and they automatically close when there is pressure of combustion of gases rearwardly of the flap valves. In this form, when the flap-valves are used, the fuel will be injected by the fuel supply means, previously described, in pulses, timed by the fuel pumping means. The fuel pumps may be adapted for pulse delivery of the fuel in any known manner, and this is contemplated to be a function of the pumping means for supply of fuel. I contemplate that flap-valves such as in Figure 10, in modified form to conform to the contour of the conduits or channels 5 and 6, of the first form, may be placed therein to perform as in the modified form of Figs. 8, 9, and in that event the fuel delivery will be pulsing delivery, by the fuel pumps.

It should be particularly noted that it is contemplated, that either form of my device may operate either as a continuous flow or as a pulse flow type of ram-jet, when the valve means, as described, is by the control means, placed in the position for the ram-jet operation of the device. The flap-valve means, may be used in either form in the ram-jet flow channels, for procuring pulsing of the air-flow, and operation as a pulse-flow ram-jet, or this flap-valve means may be omitted from the construction, in either form shown. In some constructions, the continuous-flow may be advisable, while in other constructions, a pulsing flow may be advisable, and the construction will be accordingly made. So it is expressly to be understood that omission of the flap-valve means in either form shown, does not mean and is not to be understood to mean, the the flap-valve means is not to be used in the construction. In any construction the channels and passages for the ram-jet flow of air and gases, will be constructed in such form and of such transverse shape and proportion, especially, as will contribute to the efficiency of the operation in the manner intended. The principles of ram-jet propulsion are known and it is intended that the construction and operation will generally be according to the known requirements for such operation.

While I have shown particular devices and combinations of devices in the illustration of my invention, I contemplate that other detailed devices and combinations of devices, may be used in the realization of my invention, without departing from the spirit, and contemplation thereof.

What I claim is:

1. In a propulsion means, a compressor and turbine means comprising an air induction chamber, a compressor, a fluid connection between the air induction chamber and the compressor, a combustion chamber receiving compressed air from the compressor, a turbine receiving combustion gases from the combustion chamber, a connection between the compressor and the turbine for driving the compressor, an atmospheric air intake forwardly directed, an expulsion tube rearwardly directed, a valve chamber between the atmospheric air intake and the expulsion tube, valve means in the valve chamber movable between two alternate positions, one position for directing air from the atmospheric air intake to the air induction chamber and for directing expulsion gases from the turbine to the expulsion tube, and in the alternate position directing air from the atmospheric air intake through the valve chamber to the expulsion tube, fuel supplying means for injecting fuel in one said condition to the combustion chamber and in an alternate condition for injecting fuel to air passing from said valve chamber to said expulsion tube, and ignition means arranged for initiating combustion in either of said conditions of operation, as fuel flows to said combustion chamber or to air passing from said valve chamber to said expulsion tube.

2. In a propulsion means, a power unit casing having formed therein a compressor chamber, a combustion chamber and a turbine chamber, a compressor rotor in said compressor chamber, a turbine rotor in said turbine chamber and a connection between said rotors for driving one of said rotors by the other, an air intake forwardly directed and open to atmosphere for receiving atmospheric air, an expulsion tube directed oppositely to said air intake and open to atmosphere in said opposite direction, a passage from said air intake to said expulsion tube, valve means interposed in said passage, a connecting port between said passage and said compressor chamber, a connecting port between said turbine and said passage, the said valve means being movable between two alternate positions, in one position directing air from said air intake through said first named connecting port to said compressor and through said second named connecting port from said turbine to said expulsion tube, and in the alternate position directing air through said passage to said expulsion tube, a fuel supply means for injecting fuel in the one position of said valve means into said combustion chamber and in the other position of said valve means to said passage, and ignition means for initiating ignition in said combustion chamber or in said passage as fuel flows to said combustion chamber or to said passage.

3. In a propulsion means, a pair of power units each having a compressor chamber, a combustion chamber and a turbine chamber, a pair of compressor rotors, one in each compressor chamber, a pair of turbine rotors, one in each turbine chamber, a driving connection between each turbine rotor and its associated compressor rotor, an air intake forwardly directed and located intermediately of said power units for receiving atmospheric air, an expulsion tube directed oppositely to said air intake and open to atmosphere in said opposite direction and located intermediately of said power units, a passage from said air intake to said expulsion tube, a valve means interposed in said passage, connecting ports between said passage and said compressor chambers, connecting ports between said turbine chambers and said passage, the said valve means movable between two alternate positions, said valve means in one position directing air from said air intake through said first named connecting ports to said compressors, and through said second named ports from said turbines to said expulsion tube, and in the other position directing air from said inlet through said passage to said expulsion tube, a fuel supply means for injecting fuel in said one position of said valve means into said combustion chambers and in the other position of said valve means to said passage, and ignition means for initiating ignition in said combustion chambers or in said passage, as fuel flows to said combustion chambers or to said passage.

4. In a propulsion means, an air intake tube forwardly directed, a discharge tube rearwardly directed and open to atmosphere, an intermediate transfer passage, a compressor turbine means mounted adjacent said intake and discharge tubes and passage and having rotatable therein a compressor rotor and turbine rotor and connecting drive means between the rotors for driving of one by the other, a combustion chamber between said compressor rotor and said turbine rotor and means for injection of fuel thereto when air flows therethrough, a port from said air intake to said compressor, a port from the said turbine to said discharge tube, valve means arranged to control said ports and said intermediate transfer passage for the passage of air from said air intake through said transfer passage to said discharge tube in one position of the valve means and in another position of the valve means to direct flow of air from said air intake through one of said ports to said compressor and from the other of said ports to said discharge tube and in said last named position blocking passage of air through said intermediate transfer passage, means for injecting fuel to air passing through said transfer passage to said discharge tube when the valve means directs said passage of air, and means for initiating ignition in either said combustion chamber or in said air passing from said transfer passage to said discharge tube as fuel enters to either.

5. In a propulsion means, an air intake forwardly directed, a discharge tube rearwardly directed and open to atmosphere, an intermediate transfer passage, a plural number of compressor-turbine units mounted adjacent said intake and discharge tubes and passage, each compressor-turbine unit having rotatable therein a compressor-turbine rotor means, each of said means rotating as a unit, a combustion chamber means between the compressor means and turbine means of said compressor-turbine units and means for injection of fuel thereto when air blows therethrough, ports from said air intake to said compressor means and ports from said turbine means to said discharge tube, valve means arranged to control said ports and said intermediate transfer passage for the passage of air from said air intake through said transfer passage to said discharge tube in one position of the valve means and in another position of the valve means to direct flow of air from said air intake through said first named ports to said compressor and through said second named ports to said discharge tube and in said last named position blocking passage of air through said intermediate transfer passage, means for injecting fuel to air passing through said transfer passage to said discharge tube when the valve means directs said passing of air, and means for initiating combustion of air and fuel in said combustion chamber means or of air and fuel passing by way of said transfer passage to said discharge tube, as fuel flows to either.

6. In a propulsion means, an air intake tube forwardly directed and open to atmosphere, a discharge tube rearwardly directed and open to atmosphere, an intermediate transfer passage, a plural number of compressor-turbine units mounted adjacent said intake and discharge tubes and passage, each compressor-turbine unit having rotatable therein a compressor-turbine rotor means, each of said means rotating as a unit, a combustion chamber means between the compressor and turbine of said compressor-turbine rotor means and means for injection of fuel thereto when air flows therethrough, ports from said air intake to said compressor means and ports from said turbine means to said discharge tube, valve means arranged axially of said air intake and said discharge tube to control said ports and said intermediate transfer passage for the passage of air from said air intake through said transfer passage to said discharge tube in one position of the valve means and in another position of the valve means to direct flow of air from said air intake through said first named ports to said compressor and through said second named ports to said discharge tube and in said last named position blocking passage of air through said intermediate passage, means for injecting fuel to air passing through said transfer passage to said discharge tube when the valve means directs said passing of air, and means for initiating combustion of air and fuel in said combustion chamber means or of air and fuel passing by way of said transfer passage to said discharge tube, as fuel flows to either.

7. In a propulsion means, an air intake forwardly directed and open to atmosphere, a discharge tube rearwardly directed and open to atmosphere, an intermediate passage arranged to be connected with said air intake at its forward end and to be connected with said discharge tube at its rearward end, a plural number of compressor-turbine units mounted adjacent said intake and discharge tubes and passage, each compressor-turbine unit having rotatable therein a compressor-turbine rotor means, each of said means rotating as a unit, a combustion chamber means between the compressor means and turbine means of said compressor-turbine rotor means and means for injection of fuel thereto, ports from said air intake to said compressor means and ports from said turbine means to said discharge tube, valve means arranged axially of said air intake and said discharge tube to control said ports and the entry to and discharge from said intermediate transfer passage, said valve means comprising a valve member movably disposed in said air intake and having ports adapted to open said air intake to said transfer passage in one position and having ports adapted to open said air intake to said first named ports to said compressor means in another position, said valve means comprising also a valve member movably disposed in said discharge tube and having ports adapted to open said transfer passage to said discharge tube in one position and having ports adapted to open said second named ports from said turbine means to said discharge tube in another position, means for injecting fuel to air passing through said transfer passage to said discharge tube when the valve means directs such passage, and means for initiating combustion of air and fuel in said combustion chamber means or of air passing from said transfer passage with fuel to said discharge tube as fuel enters to either.

8. In a propulsion means as defined in claim 7, said valve in said air intake having a conically pointed form pointed forwardly and provided with air directing channels directing air toward said ports from said air intake to said compressor means when placed to connect therewith, and having ports in its rear end to connect with said transfer passage when placed to connect therewith, and the said valve in said discharge tube having a conically pointed form pointed rearwardly and provided with gas directing channels receiving gases from said ports from said turbine means when placed to connect therewith and having ports in its forward end to connect with the rear ends of said transfer passage when placed to connect therewith, and a shaft means connecting said valve in said air intake and said valve in said discharge tube, the said shaft means having bearing mounting intermediately of said valve and having in connection means for rotating said shaft means and valve means to place said valve means in either of said alternate positions.

9. In a propulsion means, a power unit having rotatably mounted therein a compressor-turbine rotor, a compressor intake for passing air to said compressor-turbine rotor, a combustion chamber intermediately of said compressor and turbine, an exhaust port from said turbine of said compressor-turbine rotor, an air intake forwardly directed and open to atmosphere at its forward end, an expulsion tube rearwardly directed and open to atmosphere at its rear end, transfer passages outwardly of said power unit, each connected at its forward end with said air intake at the rear end thereof and each connected at its rearward end with the said expulsion tube at the forward end thereof, valve means including a valve in said air intake having a form to direct entry of air to said compressor intake and block entry of air to said transfer passages when placed in one position and when placed in the alternate position to permit entry of air from said air intake to said transfer passages and block entry of air from said air intake to said compressor intake, said valve means including also a valve in said expulsion tube having a form to direct discharge of gases from said turbine exhaust port to said expulsion tube and block discharge from said transfer passages to said expulsion tube when placed in the one position and to direct discharge from said transfer passages to said expulsion tube and block discharge from said turbine exhaust port when placed in the alternate position, means for placing said valve means in the one position or the alternate position, means for injecting fuel to said combustion chamber or alternately to air flowing from said transfer passages to said expulsion tube, and means for initiating combustion in either of said conditions of operation.

10. In a propulsion means as defined in claim 2: said valve means being rotatable in said passage on an axis longitudinally thereof and mounted in bearing means to absorb thrust axially, and means to place said valve means in either of said alternate positions.

References Cited in the file of this patent

UNITED STATES PATENTS

| | | |
|---|---|---|
| 2,577,919 | Roy | Dec. 11, 1951 |
| 2,635,420 | Jonker | Apr. 21, 1953 |
| 2,641,902 | Kerr | June 16, 1953 |
| 2,672,726 | Wolf et al. | Mar. 23, 1954 |
| 2,696,078 | Waitzman | Dec. 7, 1954 |
| 2,762,192 | Ward | Sept. 11, 1956 |

FOREIGN PATENTS

| | | |
|---|---|---|
| 768,035 | Germany | May 26, 1955 |
| 716,456 | Great Britain | Oct. 6, 1954 |